United States Patent [19]
Eto

[11] Patent Number: 5,469,036
[45] Date of Patent: Nov. 21, 1995

[54] APPARATUS FOR FEEDING ELECTRICITY TO MOTOR DRIVING MEANS OF A MOVABLE BODY

[75] Inventor: Tetsutaro Eto, Tokyo, Japan

[73] Assignee: Eto Denki Co., Tokyo, Japan

[21] Appl. No.: 219,795

[22] Filed: Mar. 29, 1994

[30]   Foreign Application Priority Data

Mar. 29, 1993 [JP] Japan .................................. 5-070422

[51] Int. Cl.⁶ ...................................................... A63F 9/14
[52] U.S. Cl. .............................. 318/581; 318/16; 191/10; 191/14; 273/86 B
[58] Field of Search ............................. 318/16, 580, 581, 318/587; 191/4, 5, 6, 7, 10, 14; 320/5, 9; 336/15, 45, 116, 130; 273/85 R, 86 R, 86 B

[56]   References Cited

U.S. PATENT DOCUMENTS 3,914,562  10/1975  Bolger .

4,007,817  2/1977  Bolger, Jr. .
4,800,328  1/1989  Bolger et al. .
5,207,304  5/1993  Lechner et al. .
5,311,973  5/1994  Tseng et al. .

FOREIGN PATENT DOCUMENTS 2-92383  4/1990  Japan .

*Primary Examiner*—Bentsu Ro
*Attorney, Agent, or Firm*—Foley & Lardner

[57]                  ABSTRACT

Motors 14 and 17 are mounted on a moving member 9 disposed on an upper surface of a track plate 8. The motors 14 and 17 are adapted to move and drive the moving member 9 along the track plate surface. Primary coils 33 and 34 are disposed below the track plate surface. Secondary coils 52c and 55 are mounted on the moving member 9. The secondary coils 52c and 55 are adapted to receive electric power from the primary coils 33 and 34.

6 Claims, 12 Drawing Sheets

FIG. IA
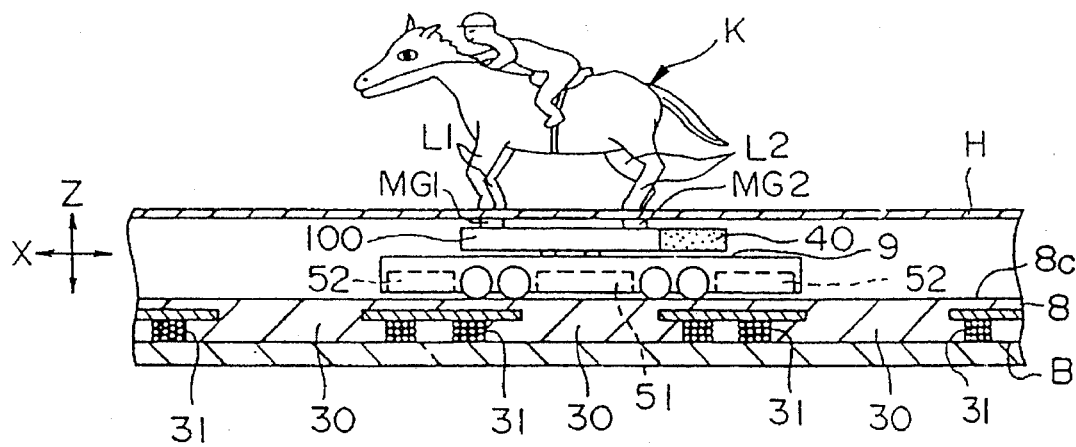
FIG. IB
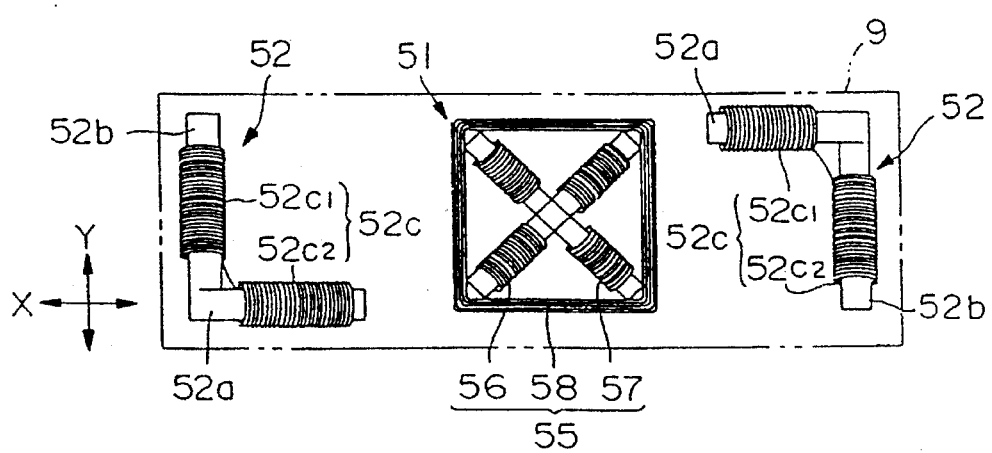

APPARATUS FOR FEEDING ELECTRICITY TO MOTOR DRIVING MEANS OF A MOVABLE BODY

BACKGROUND OF THE INVENTION

1. Field of the Invention

This invention relates to an apparatus for feeding electric power from an immobile power supply, which is disposed on a side of a stationary-plate surface facing a moving member on which a power receiving means is mounted, to an electric drive means disposed on a moving-member-side.

2. Description of the Prior Art

Horse racing game apparatuses are installed in many game centers. In these game apparatuses, a drive mechanism as shown in FIG. 14 is used for driving a horse model.

In this drive mechanism, a running member 2 that runs on a track plate 1 is disposed on the track plate 1 having a plurality of guide grooves 1a.

The drive mechanism of the running member 2 comprises a drive wheel 4 and sprockets 6 and 6. The drive wheel 4 is rotated by a motor 3 that serves as a drive means through a reduction sear (not shown) so as to move the running member 2 in a forward direction (in which the guide grooves extend). The sprockets 6 and 6 are engaged with the guide grooves 1a on the track plate 1 so as to move the running member 2 in left and right directions.

The drive wheel 4 comprises two divided wheels 4a and 4b. Rubber belts 4c and 4d are disposed on the outer peripheries of the divided wheels 4a and 4b, respectively. The divided wheels 4a and 4b are pivoted by support shafts 7 and 7, respectively. Thus, the divided wheels 4a and 4b are slidable along the respective support shafts 7 and 7.

While the rubber belts 4c of the divided wheel 4a or the rubber belt 4d of the divided wheel 4b is in contact with the track plate 1, when the running member 2 is moved in the left or right direction by the rotations of the sprockets 6 and 6, the divided wheel 4a or 4b is moved in the right or left direction on the support shaft 7. Thus, while the running member 2 is moved forward by the drive wheel 4, it can be moved in the left and right directions by the sprockets 6 and 6. Consequently, the running member 2 can be obliquely moved. An example of this type of apparatus is disclosed in Japanese Patent Laid-Open Publication No. Hei 2-92383.

Electric power to the motors 3 and 5 is supplied by a battery (not shown) mounted in the running member 2. Electric power to the running member 2 at a start position is supplied by a power supply disposed on a stationary side.

The electric power is supplied to the battery through a brush and a power feeder terminal disposed on a stationary side. The brush is disposed on the running member 2. The stationary-side power feeder terminal is disposed in the start position of the horse model. In other words, while the horse model is stopped in the start position along with the running member 2, the electric power from the stationary-side power supply is supplied to the battery through the power feeder terminal and the brush by bringing the brush into contact with the power feeder terminal.

However, since this power feeding system uses the brush, the brush and the contact portion of the stationary-side power feeder terminal will be oxidized over extended operation. Thus, problems may occur in the supply of electric power to the battery.

SUMMARY OF THE INVENTION

It is therefore an object of the present invention to provide an apparatus for properly supplying electric power to a moving-member-side electric drive means without influence of such oxidization.

To accomplish the object, a power feeding apparatus for a moving-member-side electric drive means according to the invention comprises a moving member disposed on a surface of a track plate, an electric drive means mounted in the moving member and adapted to move and drive the moving member along the moving-member-disposed surface, a plurality of primary coils disposed along and below the moving-member-disposed surface, a plurality of secondary coils mounted in the moving member and adapted to receive electric power from the primary coils, and an arithmetic control circuit for supplying electric power obtained by the secondary coils to the electric drive means.

In the invention, the primary coils can be disposed in parallel along the moving-member-disposed surface.

In the invention, one of two adjacent coils of the primary coils receives an alternate current opposite in phase to an alternate current of the other of the two through a phase control circuit.

In the invention, each of the secondary coils has a first coil, a second coil, and a third coil. The first and second coils are wound around axes that are in parallel with the moving-member-disposed surface and perpendicular to each other. The third coil is wound around the end surfaces of the axes.

In the invention, the arithmetic control circuit can be adapted to receive control information from a controller through a radio communication means.

In the invention, the radio communication means comprises an information receiving means mounted on the moving member and connected to the arithmetic control circuit and an information transmitting means disposed above the track plate and adjacent to a peripheral portion of the track plate.

In the invention, the information receiving means is a light receiving device and the information transmitting means is a light emitting device.

In the invention, a surface plate is disposed above the track plate apart from the track plate. The space formed between the track plate and the surface plate is closed by side walls. The light emitting device is disposed between the running member and the surface plate.

BRIEF DESCRIPTION OF THE DRAWINGS

FIG. 1(a) is a schematic sectional view showing a game apparatus having a power feeding unit that supplies electric power to a running-member-side electric drive means according to the present invention.

FIG. 1(b) is a schematic explanatory bottom view showing a layout of a coil assembly disposed in the running member of FIG. 1 (a).

FIG. 6 (b) is a schematic plan view showing another example of the track plate shown in FIG. 1(a).

FIG. 9 is an overall perspective view showing that the running member according to an embodiment of the present invention is running on the track plate.

DETAILED DESCRIPTION OF THE PREFERRED EMBODIMENT

The embodiment of the present invention will be described hereinafter with reference to the accompanying drawings.

FIGS. 1(a) to 13 show the embodiment of the present invention.

In FIG. 1(a), a track plate 8 is disposed on a base B. The track plate 8 is made of resin. A running member 9 is disposed on the track plate 8. The running member 9 is provided with a leg drive unit 100. A surface plate H is disposed on the leg drive unit 100. The surface plate H is made of resin. A horse model K is disposed on the surface plate H. Magnets (not shown) disposed at lower end portions of front less L1 and rear less L2 of the horse model K are magnetically connected to magnets MG1 and MG2 disposed on the leg drive unit 100 through the surface plate H so that the horse model is slidably moved on the surface plate H along with the running member 9.

Mechanical Construction of Track Plate Side

Figure 6A:
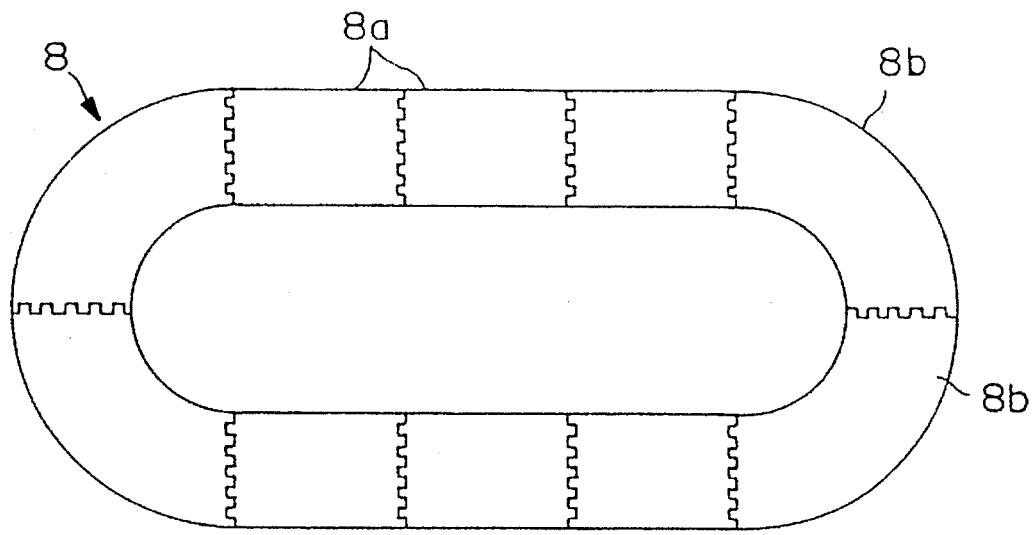
FIG. 6 (a) is a plan view showing the track plate shown in FIG. 1(a).
Figure 8:
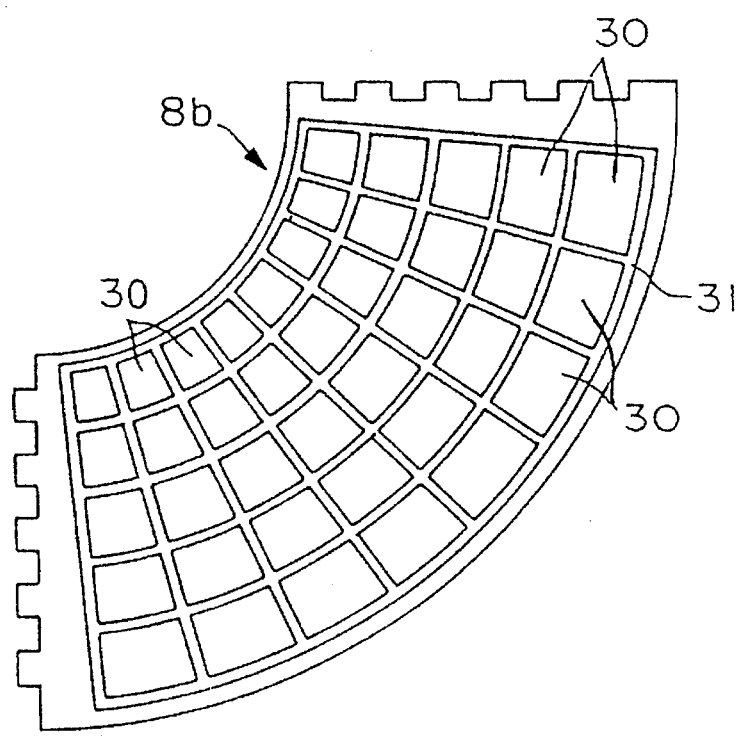
FIG. 8 is a bottom view showing a sector-shaped panel constructing the track plate shown in FIG. 6(a).
Figure 9:
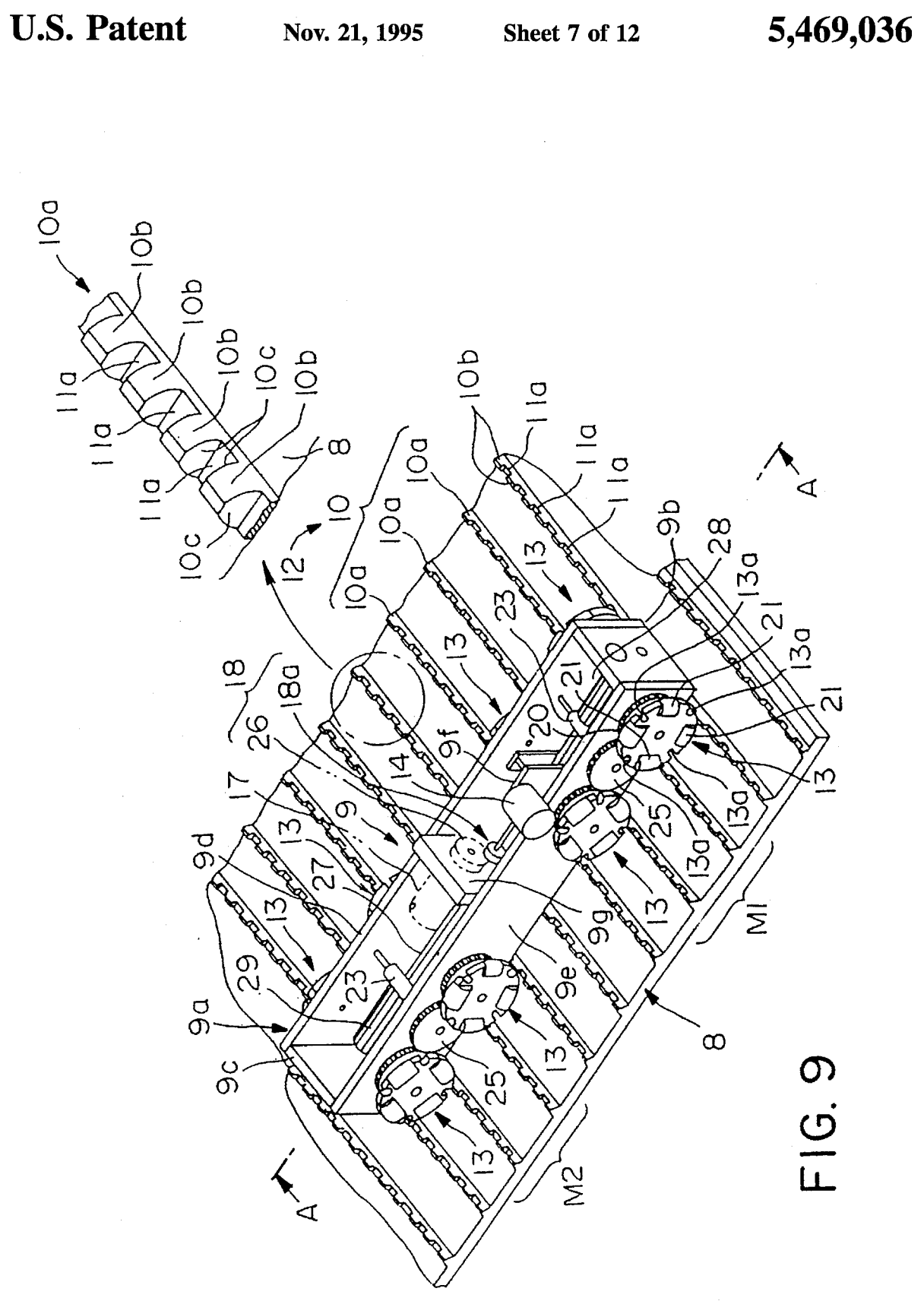

As shown in FIG. 6(a), the track plate 8 is constructed of a plurality of straight panels 8a (see FIG.7) and a plurality of sector-shaped panels 8b (see FIG. 8). The upper surface of the track plate 8 is a running-member-disposed surface 8c (track surface) on which the running member 9 is disposed. A guide means 12 is formed on the track plate 8. The guide means 12 is constructed of a plurality of longitudinal racks 10 and a plurality of lateral racks 10a, as shown in FIG. 9.

Each longitudinal rack 10 is constructed of a plurality of lateral racks 10a disposed at equal pitches in a main running direction of the running member 9. Each of the lateral racks 10a is constructed of a plurality of rack teeth 10b disposed at equal pitches in an elongate direction. Reference numeral 11a is an engagement groove defined between the rack teeth 10b and 10b. The height of the bottom surface of the engagement groove 11a is slightly larger than the height of the other portion of the track plate 8.

Side walls 10c of the rack teeth 10b of the lateral racks 10a are not always perpendicular to an alignment direction of the rack teeth 10b. For example, the side walls 10c may be defined in a curved shape similar to the tooth wall shape in the alignment direction of the lateral racks 10a. In other words, the side walls 10c may be defined in the tooth wall shape of an involute curve.

Figure 2A:
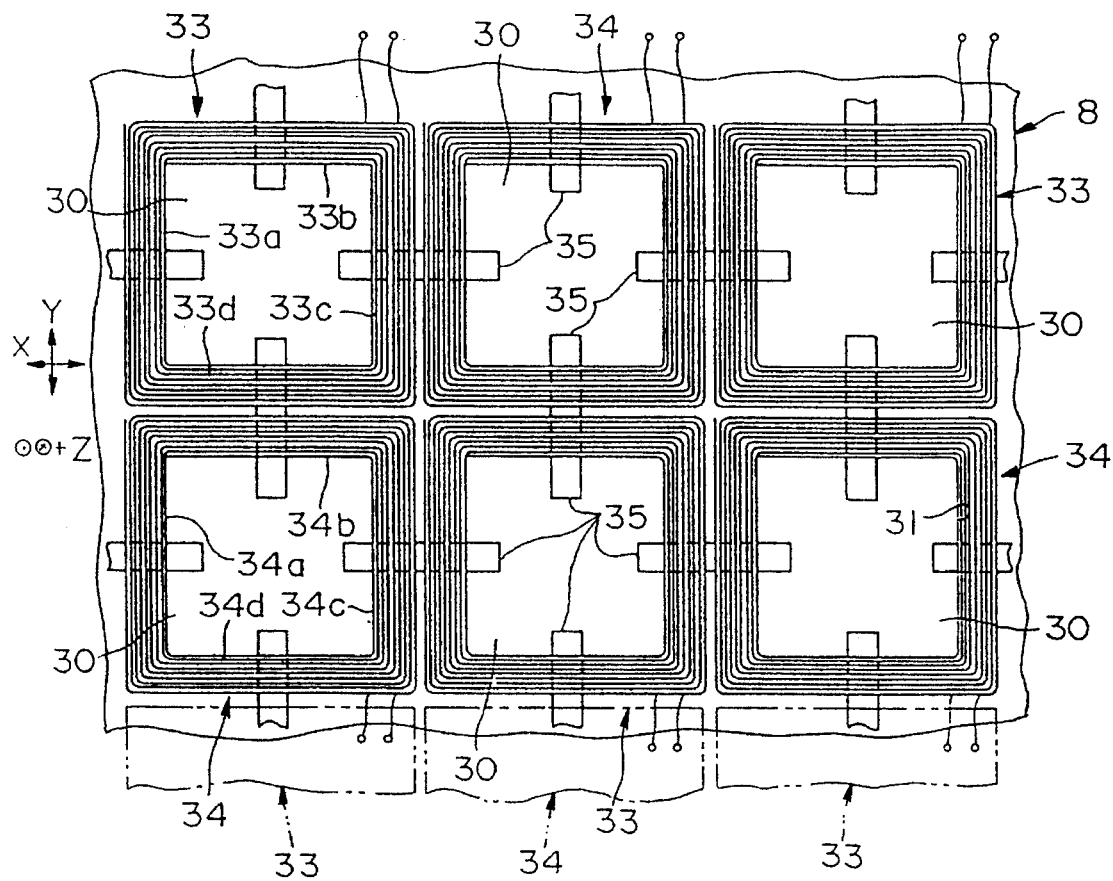
FIG. 2(a) is a partial bottom view showing a track plate shown in FIG. 1(a).

As shown in FIGS. 1(a), 2(a), 7, and 8, a large number of protrusions 30 and grooves 31 are formed on the lower surfaces of the straight panels 8a and the sector-shaped panels 8b of the track plate 8. The grooves 31 are disposed in a mesh shape. As shown in FIGS. 1(a) and 2(a), primary coils 33 and 34 that are stationary-side power feeding sources are alternately disposed in the grooves 31 along the track surface 8c.

Figure 2B:
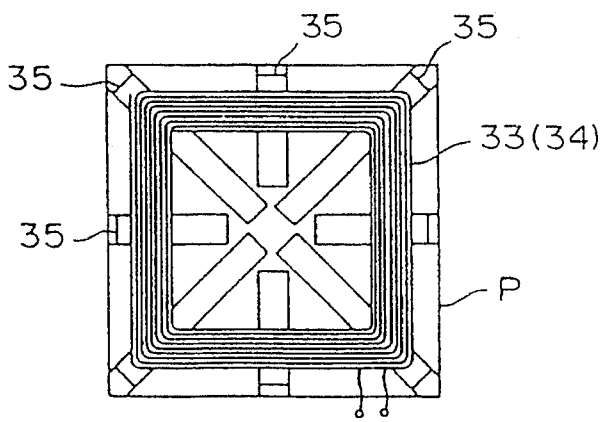
FIG. 2(b) is an explanatory view showing another example of a primary coil and a magnetic conductor disposed on the track plate of FIG. 1(a).
Figure 3:
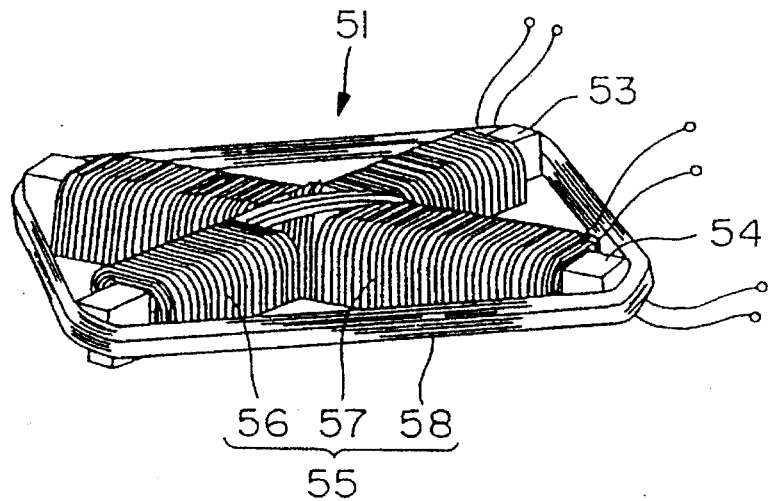
FIG. 3 is a perspective explanatory view showing principal portions of a power receiving means of FIG. 1(b).

The primary coil 33 is formed of sides 33a, 33b, 33c, and 33d nearly in a square shape. Likewise, the primary coil 34 is formed of sides 34a, 34b, 34c, and 34d nearly in the same shape as the primary coil 33. Magnetic conductors 35 are disposed on the panels 8a and 8b so that they are perpendicular to the sides 33a, 34a, 33b, 34b, 33c, 34c, 33d, and 34d. The magnetic conductors 35 are buried in the panels 8a and 8b by an insert molding method. The magnetic conductors 35 are made of a magnetic conductive material such as ferrite. In practice, as shown in FIG. 2(b), magnetic conductors 35 are additionally disposed in diagonal directions of the primary coils 33 and 34. In this construction, the magnetic resistance in the diagonal directions is lower than the magnetic resistance in the other directions so that the intensity of magnetic field to be obtained becomes strong.

Figure 6B:
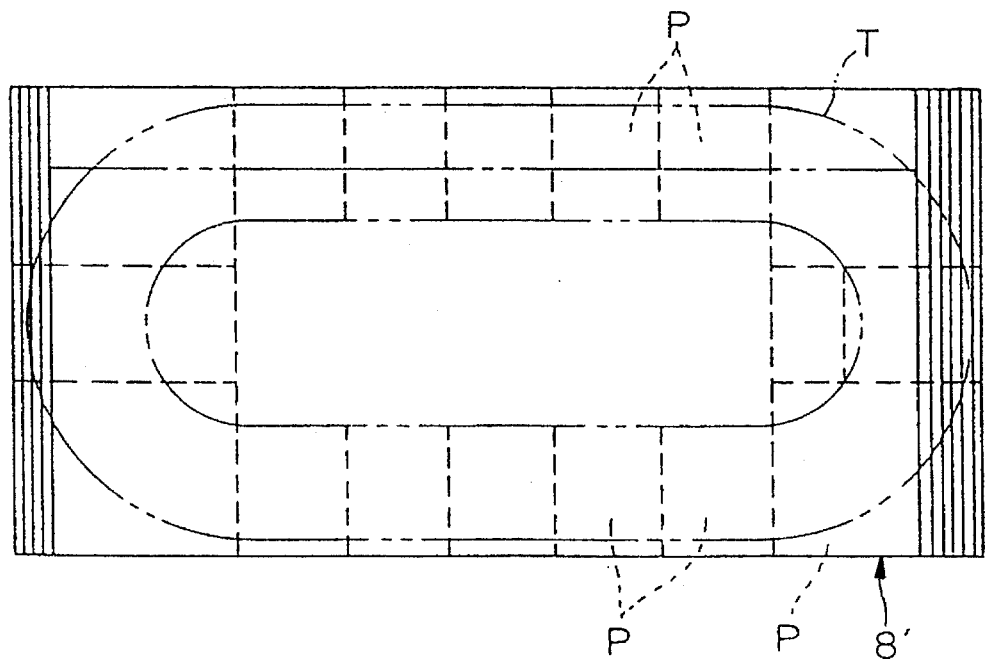
Figure 7:
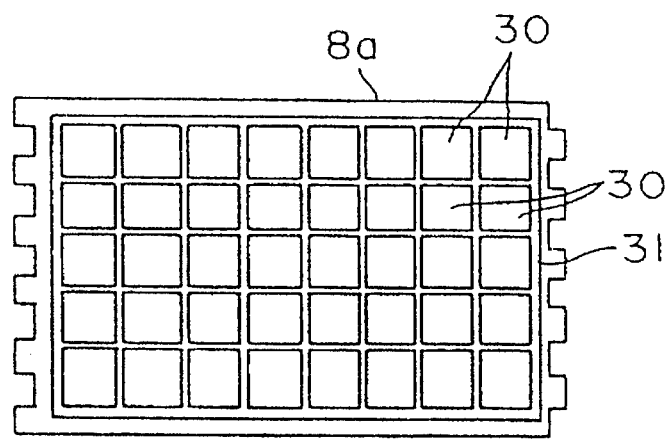
FIG. 7 is a bottom view showing a straight panel constructing the track plate shown in FIG. 6(a).

In this embodiment, the track plate 8 is constructed of a plurality of panels that are connected in a track shape. However, the present invention is not limited to such a construction. Instead, as shown in FIG. 6(b), the track plate 8 may be formed of one flat plate. In addition, as shown in FIG. 6(b), a panel P on which the primary coils 33 or 34 and the magnetic conductors 35 as shown in FIG. 2(b) are disposed may be disposed below the track plate 8 along the track T.

Mechanical Construction of Running Member Side

Figure 10:
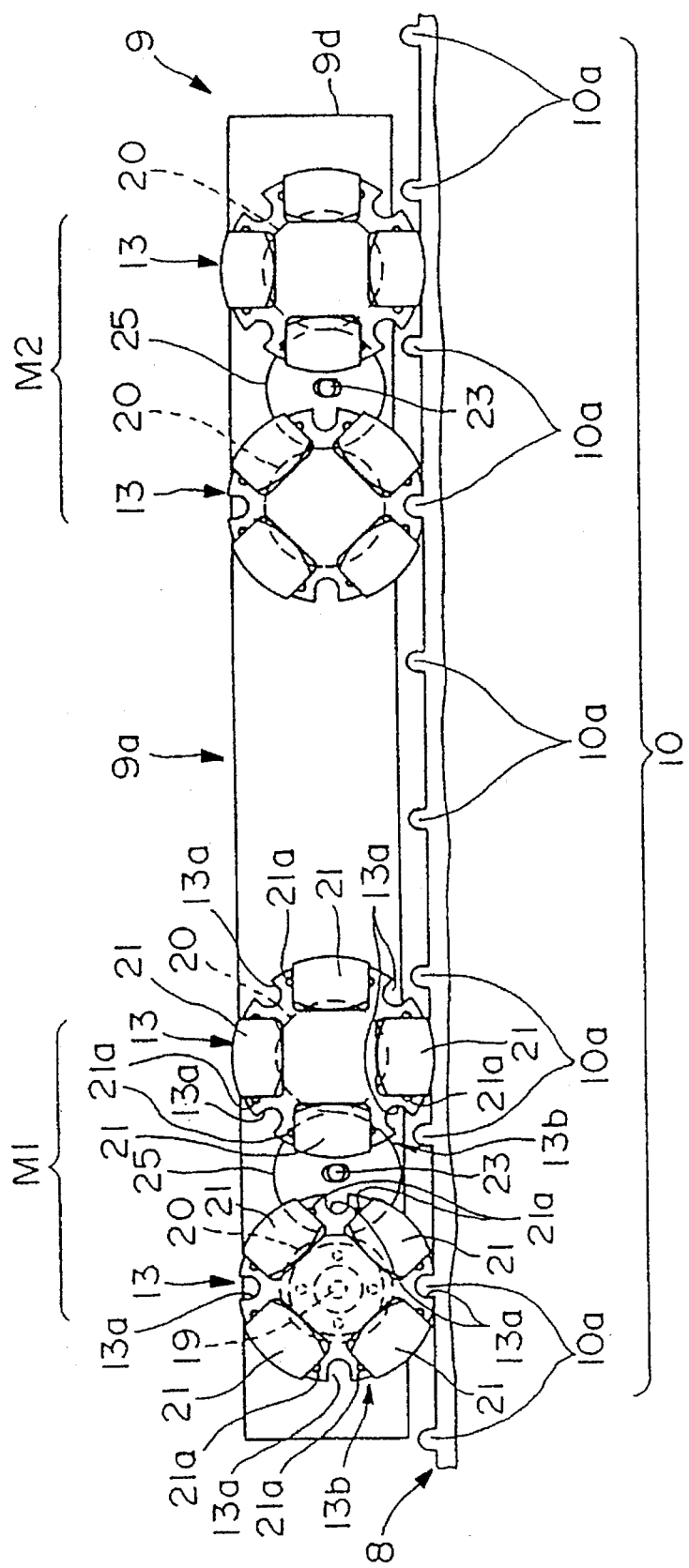
FIG. 10 is a side view of principal portions showing the relation between the track plate and running wheels according to the embodiment of the present invention.
Figure 11:
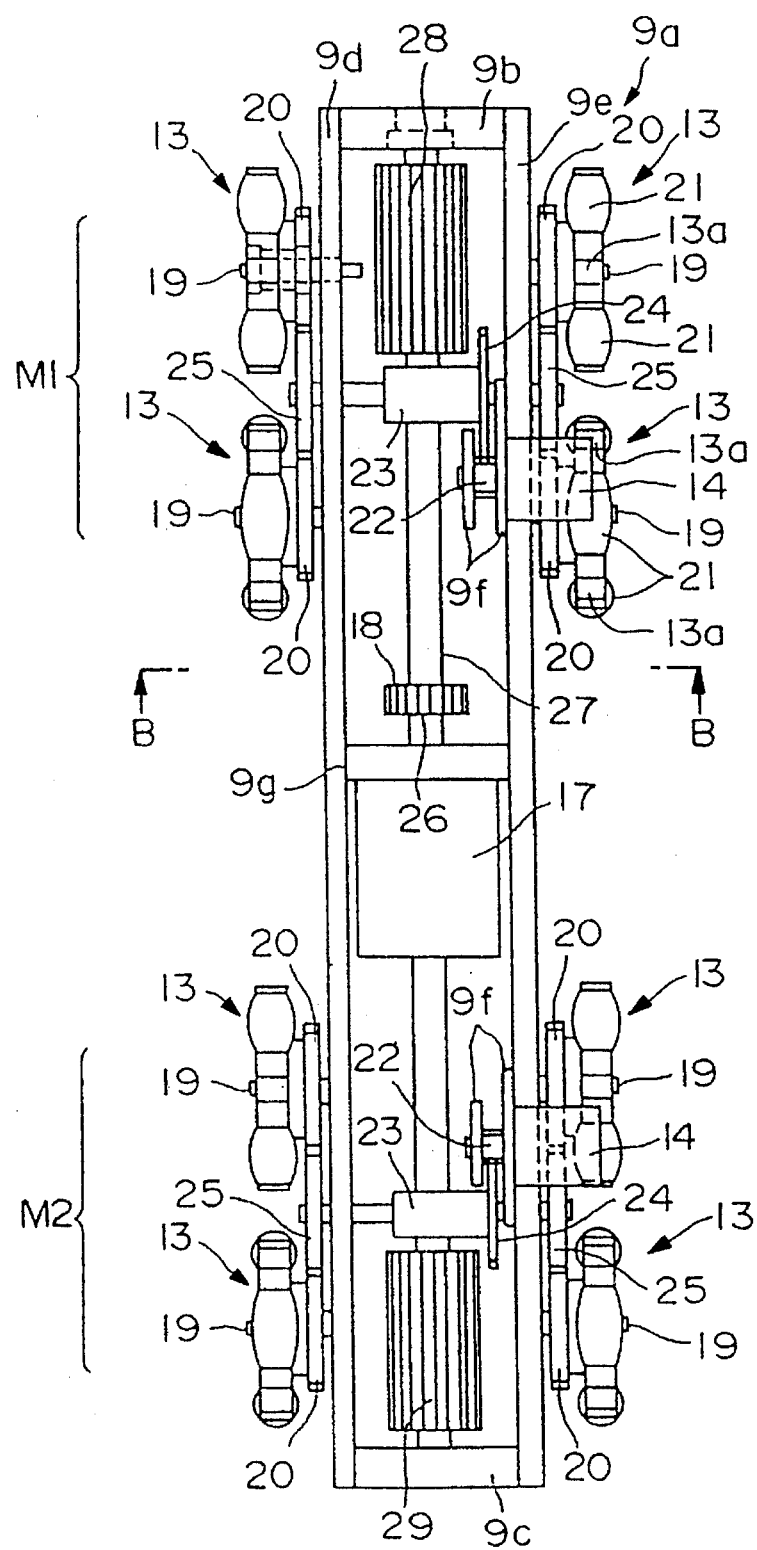
FIG. 11 is a top plan view showing the running member according to the embodiment of the present invention.

As shown in FIGS. 9, 10 and 11, the running member 9 comprises a running member main body 9a, running wheels 13, a motor 14 (electric drive portion), a reduction gear portion 15 (not shown), sprockets 28 and 29, a motor 17 (electric drive portion), and a reduction sear portion 18. The running wheels 13 are disposed on both sides of the running member main body 9a. The running wheels 13 are engaged with the longitudinal racks 10 so as to move the running member main body 9a in the alignment direction of the longitudinal racks 10. The motor 14 and the reduction gear portion 15 serve as a means for driving the running wheels 13. The sprockets 28 and 29 are engaged with the lateral racks 10a so as to move the running member main body 9a in the alignment direction of the lateral racks 10a. The motor 17 and the reduction gear portion 18 serve as a means for driving the sprockets 28 and 29. The motors 14 and 17 are pulse motors.

The running member main body 9a is constructed of a front wall 9b, a rear wall 9c, a mounting member 9g, a left side wall 9d, and a right side wall 9e. The front wall 9b, the rear wall 9c, and the mounting member 9g are nipped by the left and right side walls 9d and 9e so that an outer frame with upper and lower open ends is formed.

A front running module M1 is disposed at a front half portion of the running member main body 9a. A rear running module M2 is disposed at a rear half portion of the running member main body 9a. The construction of the front running module M1 is almost the same as the construction of the rear running module M2.

Two rotating shafts 19 and 19 extend from the side walls 9d and 9e of each of the front and rear running modules M1 and M2 and are spaced apart by a predetermined length.

The running wheel 13 and a follower gear 20 are rotatably disposed on the rotating shaft 19. The follower gear 20 is secured to the running wheel 13. A part of the front running module M1 is constructed of two pairs of the left and right running wheels 13 and the drive means. A part of the rear running module M2 is constructed of two pairs of the left and right running wheels 13 and the drive means.

First of all, the front running module M1 will be described. Engagement grooves 13a are formed at pitches of 90° on peripheral portions of the left and right running wheels 13 and 13 of the front running module M1. The engagement grooves 13a are engaged with the engagement protrusions 10a on the track plate 8, thereby forming an engagement tooth portion 13b.

Barrel-shaped bearings 21 are disposed at the engagement tooth portion 13b. The barrel-shaped bearings 21 are rotated about respective pins 21a that extend in respective arc directions of the running wheel 18. The height of the outer periphery of the barrel-shaped bearing 21 is slightly larger than the height of the periphery of the running wheel 13. The curvature of each barrel-shaped bearing 21 is nearly the same. The rotating direction of the barrel-shaped bearing 21 is perpendicular to the rotating direction of the running wheel 13.

The motor 14, which works as the drive means, is secured to the right side wall 9e through the mounting member 9f. A pinion gear 22 is disposed on a motor shaft of the motor 14. The pinion gear 22 is engaged with a reduction gear 24 that rotates and drives a drive shaft 28.

Follower gears 20 and 20 and a drive gear 25 are disposed at an end portion of the drive shaft 28. The follower gears 20 and 20 are engaged with the drive gear 25. Thus, the rotation of the drive shaft 23 is transmitted to the running wheel 18. As shown in FIG. 10, the follower gears 20 and 20 of each of the front and rear running modules M1 and M2 are engaged with the drive gear 25 in such a way that the phase of one follower gear 20 differs from the phase of the other follower gear 20 by 45°.

Thus, one set of the front and rear running wheels 13 and 13 of the front running module M1 are rotated and driven by the drive gears 25 so that when the engagement tooth portion 13b of one running wheel 13 is engaged with the longitudinal rack 10, one of the barrel-shaped bearings 21 of the other running wheel 18 is in contact with the track plate 8.

Figure 12:
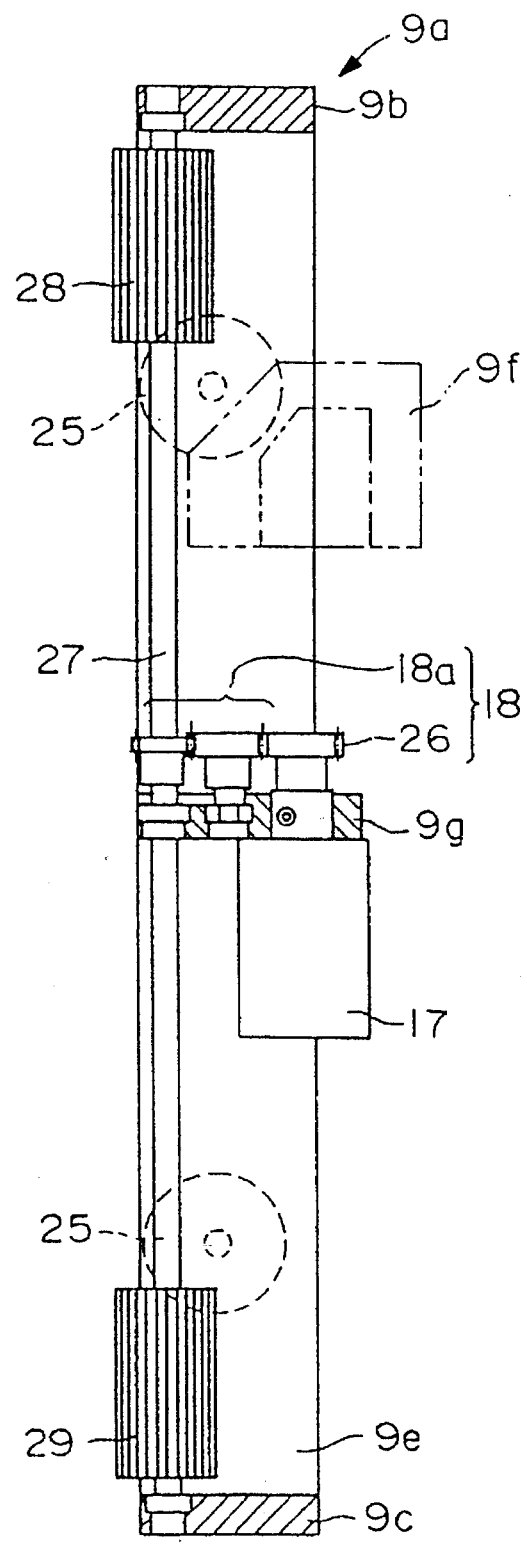
FIG. 12 is a sectional view, taken along line A—A of FIG. 9, showing a sprocket drive mechanism of the running member according to the embodiment of the present invention.
Figure 13:
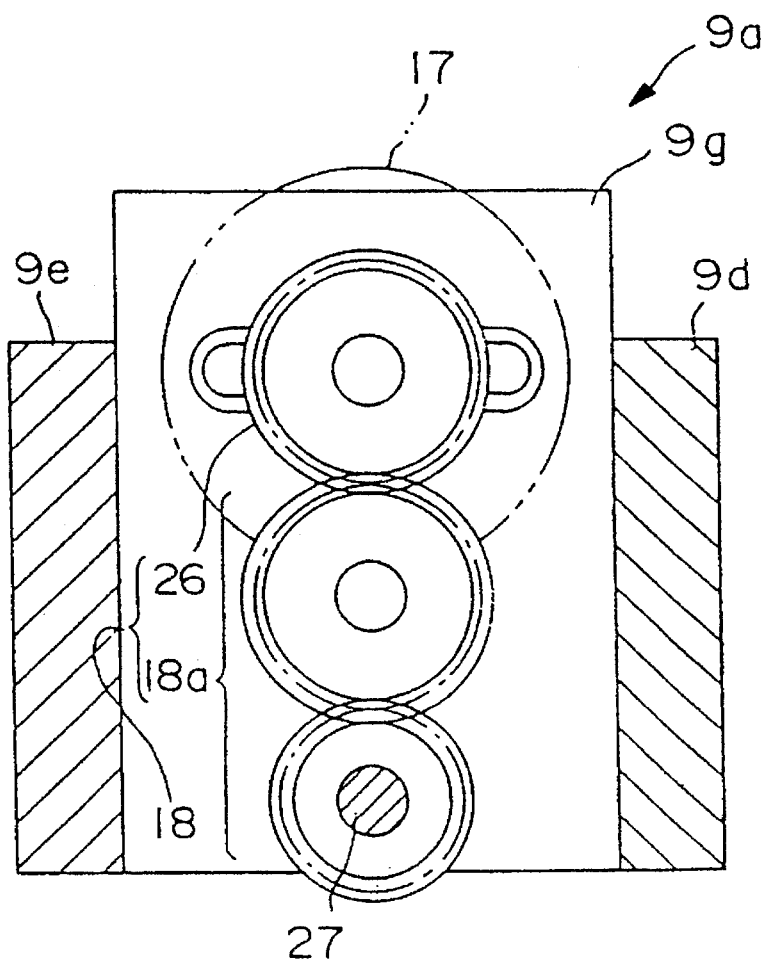
FIG. 13 is a sectional view, taken along line B—B of FIG. 11, showing a reduction gear portion of the running member according to the embodiment of the present invention.
Figure 14:
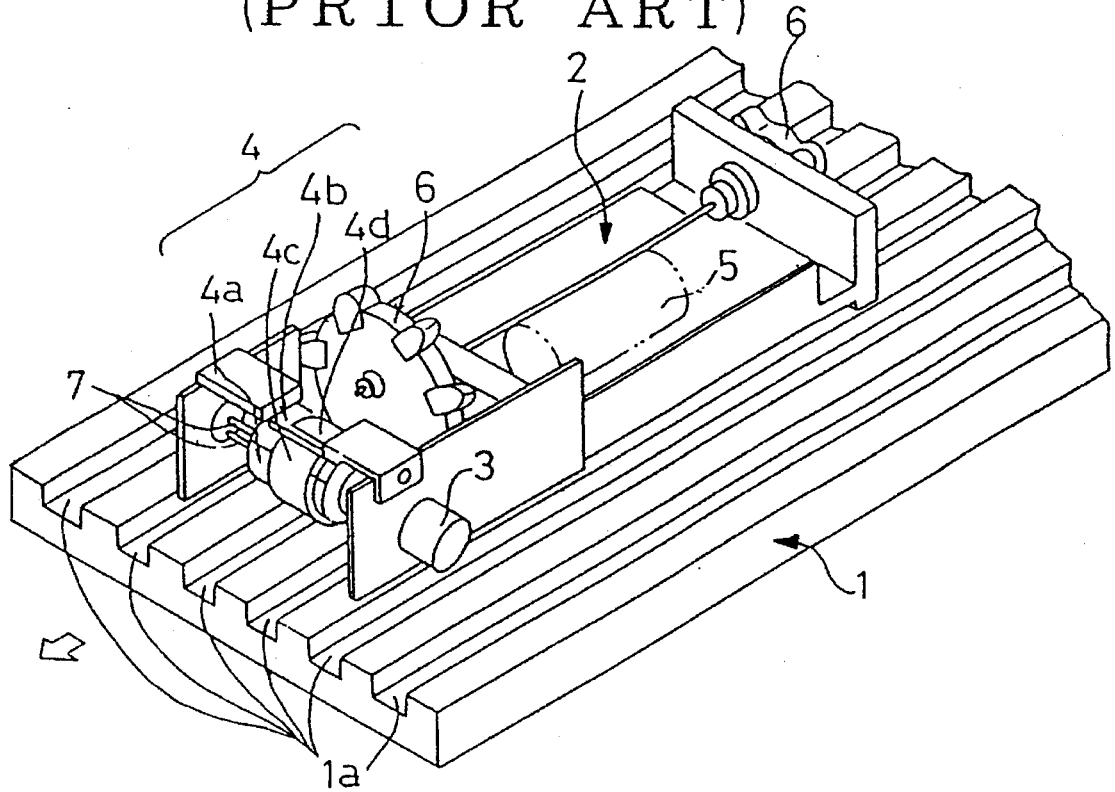
FIG. 14 is an overall perspective view showing a conventional running member that is running on a track plate.

In addition, as shown in FIG. 12, in the middle of the running member main body 9a, a motor case of the motor 17, which works as a drive means, is secured to the mounting member 9g. A pinion gear 26 is disposed on a motor shaft of the motor 17. The pinion gear 26 and a reduction gear train 18a construct the reduction gear portion 18. A rotating shaft 27 is disposed between the front and rear walls 9b and 9c. The rotating shaft 27 is rotatably pivoted between the front and rear walls 9b and 9c. The rotation of the pinion gear 26 is transmitted to the rotating shaft 27 through the reduction gear train 18a.

Sprockets 28 and 29 are disposed at front and rear end positions of the rotating shaft 27, respectively. The sprockets 28 and 29 are engaged with the lateral racks 10a on the track plate 8. Thus, as the rotating shaft 27 is rotated, the running member main body 9a is moved in the alignment direction of the lateral racks 10 a.

The lengths of the sprockets 28 and 29 are slightly larger than the distance between the adjacent longitudinal racks 10 and 10 on the track plate 8.

The rotations of the motors 14 and 17 are controlled by a controller (not shown) that includes a power supply.

The construction of the rear running module M2 is nearly the same as the construction of the front running module M1. For simplicity, the same portions as the front running module M1 are denoted by the same reference numerals and their description is omitted (see FIGS. 9 to 11).

As shown in FIG. 1(a), the running member 9 is provided with a battery 40 that works as an auxiliary power supply. In addition, the running member 9 has a movable electric power receiving unit 50 that receives electric power from the primary coils 33 and 34 (stationary-side power feeding sources).

As shown in FIG. 1(b), the electric power receiving unit 50 has a first coil assembly 51 and a pair of second coil assemblies 52. The first coil assembly 51 is disposed at the center of the running member 9. The second coil assemblies 52 are disposed at front and rear ends (in a longitudinal direction) of the running member 9. As shown in FIGS. 1 (b) and 3, the coil assembly 51 is constructed of first and second magnetic conductors 58 and 54 and a secondary coil 55 (electric power receiving means). The first and second magnetic conductors 53 and 54 are made of a magnetic conductive material such as ferrite. The second coil 55 (electric power receiving means) receives electric power from the primary coils 33 and 34 (stationary-side power feeding sources). The magnetic conductors 53 and 54 are secured to each other so that the magnetic conductor 53 is perpendicular to the magnetic conductor 54. The axial lines of the magnetic conductors 53 and 54 are in parallel with the running-member-disposed surface 8a of the track plate 8. In FIG. 2, it is assumed that the left-right direction, up-down direction, and direction perpendicular to the drawing are referred to as X, Y, and Z directions, respectively. The magnetic conductors 53 and 54 are oriented by 45° with respect to the X and Y directions.

The secondary coil 55 is constructed of a first coil 56, a second coil 57, and a third coil 58. The first and second coils 56 and 57 are wound around the first and second magnetic conductors 53 and 54, respectively. The third coil 58 is wound around end surfaces of the first and second magnetic conductors 53 and 54 along the running-member-disposed surface 8a.

As shown in FIG. 1(b), the second coil assembly 52 is constructed of a first magnetic conductor 52a, a second magnetic conductor 52b, and a secondary coil 52c (electric power receiving means). The first and second magnetic conductors 52a and 52b are made of a magnetic conductive material such as ferrite. The first and second magnetic conductors 52a and 52b are secured to each other so that the first magnetic conductor 52a is perpendicular to the second magnetic conductor 52b. The axial lines of the first and second magnetic conductors 52a and 52b are disposed in parallel with the running-member-disposed surface 8a of the track plate 8. The secondary coil 52c is constructed of a first coil 52c1 and a second coil 52c2.

The first and second coils 52c1 and 52c2 are wound around the first and second magnetic conductors 52a and 52b, respectively.

Power Feeder Circuit

Figure 4:
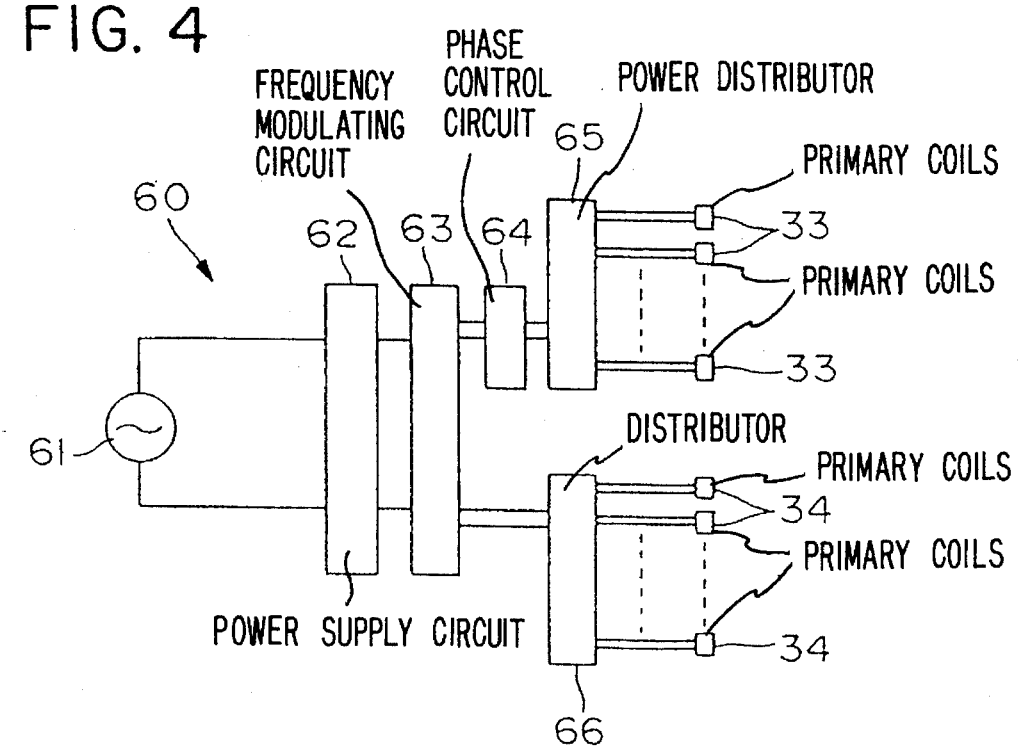
FIG. 4 is an explanatory view showing a stationary-side power feeding circuit having a primary coil shown in FIG. 1(a).
Figure 5:
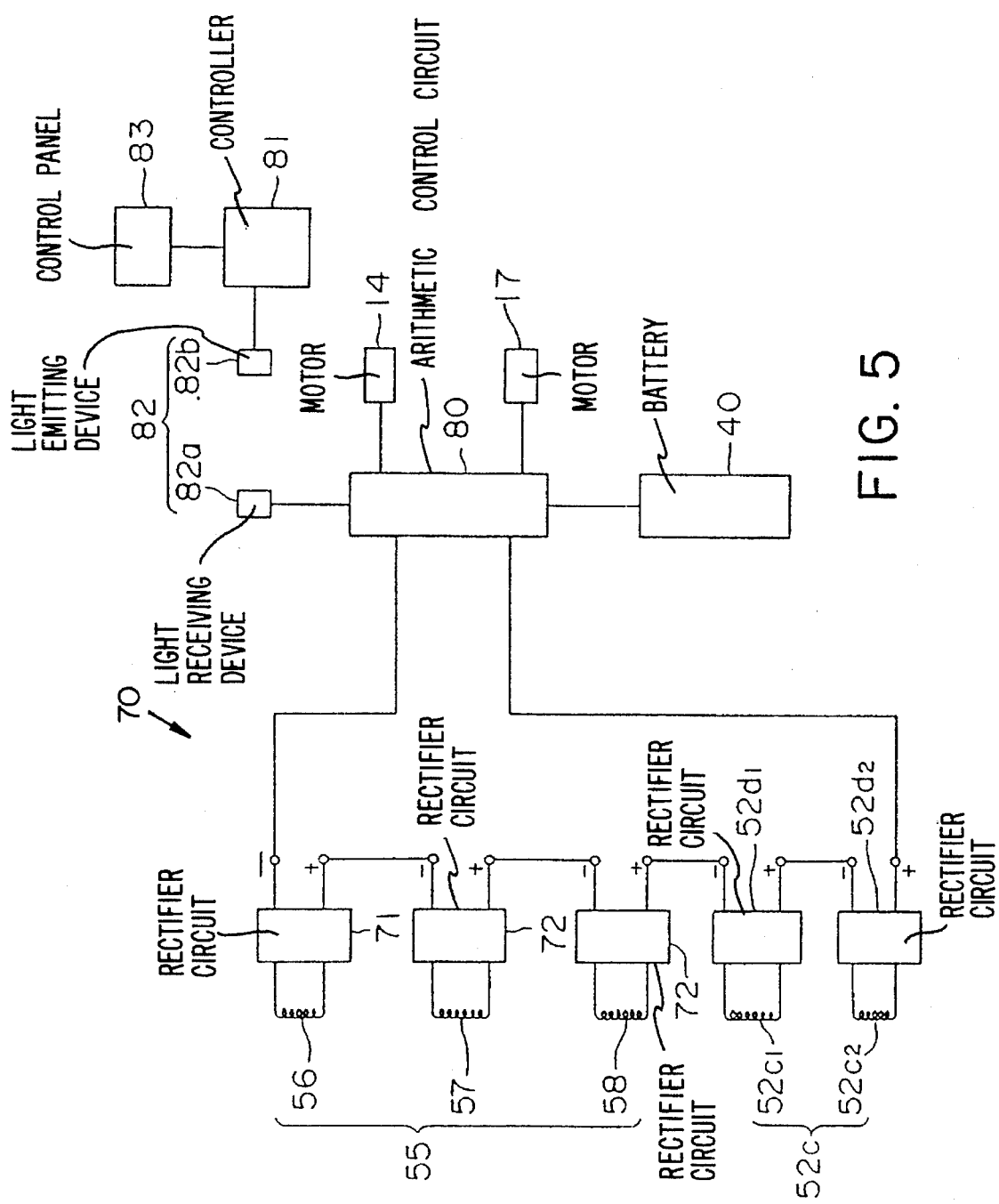
FIG. 5 is an explanatory view showing a running-member-side power feeding circuit having a secondary coil shown in FIG. 3.

A power feeding circuit is constructed of a stationary-side circuit 60 shown in FIG. 4 and a moving-member-side circuit 70 shown in FIG. 5. The stationary-side circuit 60 is disposed on the base B. The moving-member-side circuit 70 is disposed on the running member 9.

The stationary-side circuit 60 comprises a power supply circuit 62, a frequency modulating circuit 63, a phase control circuit 64, a power distributor 65, and a distributor 66. The power supply circuit 62 is connected to a commercial power supply 61 (AC power supply). The frequency modulating circuit 63 modulates a frequency of an alternate current received from the power supply circuit 62 into a high frequency. The phase control circuit 64 controls the phase of output voltage/current of the frequency modulating circuit 63. The power distributor 65 distributes the power supplied from the phase control circuit 64 to a plurality of primary coils 33. The distributor 66 distributes the electric power supplied from the frequency modulating circuit 63 to the primary coils 34.

The frequency modulating circuit 63 outputs an alternate current with a frequency ranging from 10 kHz to 30 kHz. Each of the primary coils 33 and 34 supplies electric power of around 30 W to the power supply circuit 62 and the modulating circuit 63.

The phase control circuit 65 serves to reverse the phase of an alternate current supplied to the primary coil 33 with respect to the phase of an alternate current supplied to the primary coil 34. Thus, one of two adjacent coils of the primary coils receives an alternate current opposite in phase to an alternate current received by the other of the adjacent coils from an alternate current source.

As shown in FIG. 5, the moving-member-side circuit 70 comprises the coils 52c1, 52c2, 56, 57, and 58, rectifier circuits 52d1, 52d2, 71, 72, and 73, and an arithmetic control circuit 80. The rectifier circuits 52d1, 52d2, 71, 72, and 73 are connected to the coils 52c1, 52c2, 56, 57, and 58, respectively. The outputs of the coils 52c1, 52c2, 56, 57, and 58 are connected in series. The arithmetic control circuit 80 operates with direct currents supplied from the rectifier circuits 52d1, 52d2, 71, 72, and 73 and controls pulses supplied to the motors 14 and 17.

In this embodiment, the rectifier circuits 52d1, 52d2, 71, 72, and 73 are connected in series so that a constant current and a constant voltage are obtained even if the current and voltage of one of the coils 52c1, 52c2, 56, 57, and 58 are lowered corresponding to the position of the running member and thereby the voltage and current of one of the rectifier circuits 52d1, 52d2, 71, 72, and 73 are lowered. However, the present invention is not limited to such a construction. Instead, as long as such a condition is satisfied, the rectifier circuits 52d1, 52d2, 71, 72, and 73 may be connected in parallel.

The arithmetic control circuit 80 continuously receives control information from a controller 81 that has a CPU through an optical communication means (radio communication means). The controller 81 generates control information corresponding to data entered from a control panel 83. The optical communication means 82 has a light receiving device 82a and a light emitting device 82b. The light receiving device 82a works as an information receiving means. The light receiving device 82a is connected to an input of the arithmetic control circuit 80 and is disposed on the running member 9. The light emitting device 82b works as an information transmitting means. The light emitting device 82b is connected to an output of the controller 81 and is positioned between the track plate 8 and the surface plate H. The light emitting device 82b is disposed on the base B. A side wall (not shown) is disposed between the surface plate H and a peripheral portion of the track plate 8. A space defined between the surface plate H and the track plate 8 is closed. The light emitting device 82b may be disposed on the peripheral portion of the track plate or an inner surface of the side wall (not shown), which closes the surface plate H and the peripheral portion of the track plate 8. The light emitting device 82b irradiates infrared rays or the like. The light receiving device 82a receives the infrared rays or the like.

While the running member 9 is running at a position where the voltage applied by the rectifier circuits 52d1, 52d2, and 73 is high, the arithmetic control circuit 80 causes part of the electric power supplied from the rectifier circuits 52d1, 52d2, 71, 72, and 73 to flow to the battery 40. On the other hand, while the running member 9 is running at a position where the voltage applied by the rectifier circuits 52d1, 52d2, 71, 72, and 73 is low, the arithmetic control circuit 80 causes the battery 40 to supply electric power so as to drive and control the motors 14 and 17.

Operation of the Embodiment

Next, the operation of the embodiment will be described.

Power Supply

When the running member 9 is run, the electric power of a commercial power supply 61 is supplied to the adjacent primary coils 33 and 34 through the stationary-side circuit 60. The phase of an alternate current supplied from the phase control circuit 65 to the primary coil 33 is the inverse of the phase of the alternate current supplied from the phase control circuit 65 to the primary coil 34. Thus, the orientations (directions of vectors) of the magnetic fluxes that take place at the adjacent portion of the primary coils 33 and 34 are the same, thereby strengthening the magnetic fluxes rather than offsetting them.

The primary coils 33 and 34 each generate vector components of magnetic fluxes in X, Y, and Z directions.

The first coil 56 of the first, second, and third coils 56, 57, and 58 of the secondary coil 55 is exposed to vector changes of magnetic fluxes in the X and Y directions, thereby inducing an AC electromotive force. The second coil 57 is exposed to vector changes of the magnetic fluxes in the X and Y directions of the primary coils 33 and 34, thereby inducing an AC electromotive force. The third coil 58 is exposed to vector changes of magnetic fluxes in the Z direction of the primary coils 33 and 34, thereby inducing an AC electromotive force. The coil 52c1 is exposed to vector changes of magnetic fluxes in the X directions of the primary coils 33 and 34, thereby inducing an AC electromotive force. The coil 52c2 is exposed to vector changes of magnetic fluxes in the Y directions of the primary coils 33 and 34, thereby inducing an AC electromotive force.

The alternate currents induced in the coils 52c1, 52c2, 56, 57, and 58 are converted into direct currents through the rectifiers 52d1, 52d2, 71, 72, and 73, respectively. The direct currents output from the rectifiers 52d1, 52d2, 71, 72 and 73 are combined and supplied to the arithmetic control circuit 80.

Thus, the combined current, where the outputs of the rectifiers 52d1, 52d2, 71, 72, and 73 are combined, is kept in a constant level regardless of whether the coil assembly 51 is positioned at an upper center position of each of the primary coils 33 and 34 or an adjacent position thereof. In other words, the combined current is always kept at a constant level regardless of the position of the coil assembly 51. Thus, while the running member 9 is running, the electric power is supplied to the arithmetic control circuit 80 without the need to use contacts.

While the running member 9 is running at a position where the voltage supplied from the rectifier circuits 52d1, 52d2, 71, 72, and 73 is high, the arithmetic control circuit 80 causes part of the electric power supplied from the rectifier circuits 52d1, 52d2, 71, 72, and 73 to be used to charge the battery 40. While the running member 9 is running at a position where the voltage supplied from the rectifier circuits 52d1, 52d2, 71, 72, and 73 is low, the arithmetic control circuit 80 causes the electric power to be discharged from the battery 40, so as to drive and control the motors 14 and 17.

Drive of the Running Member 9

When electric powers are supplied from the rectifier circuits 52$d$1, 52$d$2, 71, 72, and 73, the arithmetic control circuit 80 supplies drive pulses to the motors 14 and 17.

When control information of longitudinal running is supplied from the controller 81 to the arithmetic control circuit 80 through the optical communication means 82, the arithmetic control circuit 80 supplies the drive pulses to the motor 14 corresponding to the control information so as to drive and control the motor 14. When the motor 14 is driven, the front and rear running wheels 13 and 13 are rotated in the alignment direction of the longitudinal racks 10 of the track plate 8.

Thus, the engagement grooves 13$a$ and 13$a$ of the front and rear running wheels 13 and 13 are engaged with the engagement protrusions 10$a$ and 10$a$, one by one, thereby moving the running member 9 in the alignment direction of the longitudinal racks 10.

At this point, since one of the engagement grooves 13$a$ and 13$a$ of the running wheels 13 and 13 is engaged with one of the engagement protrusions 10 $a$ on the track plate 8, unlike the drive mechanism of the conventional running member, the running member according to the present invention gets never slipped. Thus, the running member 9 can be moved exactly corresponding to the rotations of the running wheels 13.

Consequently, when a stepping motor or the like is used for the motor 14, the rotations of the running wheels are determined corresponding to the number of pulses input to the motor 14 so as to control the running distance. Thus, the running member 9 can be accurately driven to a target position. As a result, since feedback control is not used, sensors or the like that measure the running distance of the running member 9 are not required.

When control information of lateral running is supplied to the arithmetic control circuit 80 from the controller 81 through the optical communication means 82, the arithmetic control circuit 80 supplies drive pulses to the motor 17 corresponding to the control information so as to drive and control the motor 17.

When the motor 17 is driven, the sprockets 28 and 29 are rotated and driven through the pinion gear 26, the reduction gear portion 18$a$, and the rotating shaft 27. Thus, the running member main body 9$a$ is moved in the alignment direction of the lateral racks 10$a$.

At this time, while the running wheels 13 and 13 are being rotated, at least one of the barrel-shaped bearings 21 of the running wheels 13 of the front running module M1 and at least one of the barrel-shaped bearings 21 of the running wheels 13 of the rear running module M2 are in contact with the track plate 8. Thus, the moving resistance of the running member 9, which runs in the alignment direction of the longitudinal racks 10, corresponds to the rotating resistance of the barrel-shaped bearings 21. Consequently, the running member 9 can be moved in an oblique direction and a lateral direction with a lower moving resistance than a sliding resistance that takes place between drive wheels and support shafts of the drive mechanism of the conventional running member.

In the moving mechanism of the running member according to the embodiment, the front and rear running modules M1 and M2 are disposed at the front and rear of the running member main body 9$a$. However, the present invention is not limited to such a construction. Instead, one of the running modules M1 and M2 may be disposed on the running member main body 9$a$. In this construction, since at least one of the barrel-shaped bearings 21 of the running wheels 13 is in contact with the track plate 8, the running member 9 can be moved in the oblique direction and the lateral direction with a low moving resistance like the construction where the two barrel-shaped bearings 21 and 21 are in contact with the track plate 8.

In addition, in the moving mechanism of the conventional running member, when the drive wheels move to the end portion of the support shaft and come in contact with the side wall of the running member, they are prohibited from being moved further in the left and right directions. Thus, the movement of the running member in the lateral direction is limited.

On the other hand, according to this embodiment, since the barrel-shaped bearings 21 are rotated in the alignment direction of the lateral racks 10$a$, the running member 9 can be securely moved in the alignment direction of the lateral racks 10 $a$ on the track plate 8 without restriction of the running member 9 in the lateral direction.

In the drive mechanism of the running member 9 according to this embodiment, the running member 9 can be smoothly moved in the alignment direction of the lateral racks 10$a$, the force required of the motor 17 can be reduced to a minimum level, thereby reducing the size and weight of the drive means.

In addition, a model of a racing horse is disposed on the track surface, which is disposed above the running member 9. The horse model and the running member 9 are attracted by magnetic force so that the horse model is preceded by the running member 9. Thus, the horse model is smoothly moved in forward, backward, oblique, left and right directions on the track surface without restriction of the path. Thus, actions similar to real horses can be created.

In the moving mechanism of the running member according to the embodiment, as the guide means of the track plate 8, the longitudinal racks 10 and the lateral racks 10$a$ are formed of rack teeth 10$b$. However, the present invention is not limited to such construction.

Instead, as long as a plurality of longitudinal racks and a plurality of lateral racks are cross-aligned in the longitudinal and lateral directions, any guide means may be used.

In this case, protrusion-shaped portions should be used instead of the engagement grooves 13$a$ of the engagement tooth portions of the running wheels 13.

In the above-described embodiment, although the longitudinal racks 10 and the lateral racks 10 $a$ are cross-aligned in the longitudinal and lateral directions and the sprockets 28 and 29 are engaged with the lateral racks 10 $a$, the running member 9 is moved in the alignment direction of the lateral racks 10$a$. However, without the lateral racks 10 $a$, the sprockets 28 and 29, and so forth, the running member 9 may be moved in the alignment direction of the longitudinal racks 10 by another moving means.

In this case, since the running member 9 is supported by the barrel-shaped bearings 21 and wheels 13, the running member 9 can be precisely moved in both the alignment direction of the longitudinal racks 10 and the alignment direction of the engagement protrusions 10$a$ of the longitudinal racks 10.

Thus, the present invention can be applied to any conveying means that must precisely move an object while moving the object in the direction perpendicular to the moving direction.

As described above, a power feeding apparatus according to the invention comprises a moving member disposed on a moving-member-disposed surface of a track plate, an electric drive means disposed in the moving member and adapted to move and drive the moving member along the moving-member-disposed surface, a plurality of primary coils disposed along and below the moving-member-disposed surface, a plurality of secondary coils disposed in the moving member and adapted to receive electric power from the primary coil, and an arithmetic control circuit for supplying electric power obtained from the secondary coils to the electric drive means. Thus, since the conventional power feeder contact portion is omitted, electric power can be properly supplied without the influence of oxidization.

According to the invention, the primary coils are disposed along the moving-member-disposed surface. Thus, electric power can be supplied to a battery of the moving member without the need to use contacts.

According to the invention, one of two adjacent coils of the primary coils receives an alternate current opposite in phase to an alternate current of the other of the two through a phase control circuit. Thus, the magnetic fluxes of the adjacent coils of the primary coils are not offset, but strengthened. Consequently, the power feeding efficiency of the electric power supplied to the battery of the moving member is improved.

According to the invention, each of the secondary coils has a first coil, a second coil, and a third coil. The first and second coils are wound around axes which are in parallel with the moving-member-disposed surface and perpendicular to each other. The third coil is wound around the end surfaces of the axes. Thus, even if the secondary coil is moved to an inner space portion of the primary coil, the third coil picks up changes of magnetic fluxes of the primary coil. Thus, electromotive force is induced in the third coil and is supplied to the battery from the third coil.

Also, according to the invention, the electric drive means of the running member is driven and controlled through the radio communication means. Thus, the running member can be driven and controlled without the need to employ feedback control.

What is claimed is:

1. A power feeding apparatus for an electric drive unit disposed on a moving-member-side, the power feeding apparatus comprising:

a moving member disposed on a track plate surface;

electric drive means mounted on the moving member to move and drive the moving member along the track plate surface;

a plurality of primary coils in parallel disposed along and below the track plate surface;

a secondary coil assembly mounted on the moving member to receive electric power from the primary coils;

a power control circuit for supplying the electric power from the secondary coil assembly to the electric drive means; and a phase control circuit by which one of two adjacent coils of said primary coils receives an alternating current opposite in phase to an alternating current of the other one of the two adjacent coils.

2. The power feeding apparatus as set forth in claim 1, wherein said secondary coil assembly comprises a first coil, a second coil, and a third coil, the first and second coils being wound around respective axes that are parallel with the track plate surface and perpendicular to each other, the third coil being wound around end surfaces of the axes.

3. A power feeding apparatus for an electric drive unit disposed on a moving-member-side, the power feeding apparatus comprising:

a moving member disposed on a track plate surface of a track plate;

electric drive means mounted on the moving member to move and drive the moving member along the track plate surface;

a primary coil disposed along and below the track plate surface;

a secondary coil mounted on the moving member to receive electric power from the primary coil;

a control circuit for supplying the electric power from the secondary coil to the electric drive means;

a light receiving device mounted on the moving member and connected to the control circuit; and a light emitting device disposed above the track plate and adjacent to a peripheral portion of the track plate to supply control information from a controller to the light receiving device.

4. The power feeding apparatus as set forth in claim 3, wherein a surface plate is disposed above and apart from the track plate, a space formed by the track plate and the surface plate being closed by side walls of the peripheral portion, said light emitting device being disposed between said moving member and the surface plate.

5. A power feeding apparatus for an electric drive unit disposed on a moving-member-side, the power feeding apparatus comprising:

a moving member disposed on a track plate surface;

electric drive means mounted on the moving member to move and drive the moving member along the track plate surface;

a primary coil disposed along and below the track plate surface;

a secondary coil assembly mounted on the moving member to receive electric power from the primary coil, the secondary coil assembly including a first coil, a second coil, and a third coil, the first and second coils being wound around respective axes that are parallel with the track plate surface and perpendicular to each other, the third coil being wound around end surfaces of the axes; and a control circuit for supplying the electric power from the secondary coil assembly to the electric drive means.

6. The power feeding apparatus as set forth in claim 5, wherein a plurality of primary coils are disposed along the track plate surface.

* * * * *